United States Patent
Kumai et al.

(10) Patent No.: US 12,043,717 B2
(45) Date of Patent: *Jul. 23, 2024

(54) FOAM SHEET, PRODUCT, FORMED PRODUCT, AND METHOD FOR PRODUCING FOAM SHEET

(71) Applicants: Yoshimitsu Kumai, Kanagawa (JP); Taichi Nemoto, Shizuoka (JP); Shizuka Hashida, Kanagawa (JP); Ryo Miyakoshi, Kanagawa (JP)

(72) Inventors: Yoshimitsu Kumai, Kanagawa (JP); Taichi Nemoto, Shizuoka (JP); Shizuka Hashida, Kanagawa (JP); Ryo Miyakoshi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/530,841

(22) Filed: Nov. 19, 2021

(65) Prior Publication Data

US 2022/0162415 A1 May 26, 2022

(30) Foreign Application Priority Data

Nov. 24, 2020 (JP) .................. 2020-194320
Oct. 6, 2021 (JP) .................. 2021-165099

(51) Int. Cl.
*C08J 5/18* (2006.01)
*C08G 63/08* (2006.01)
(Continued)

(52) U.S. Cl.
CPC .............. *C08J 9/122* (2013.01); *C08G 63/08* (2013.01); *C08J 5/18* (2013.01); *C08J 9/0066* (2013.01);
(Continued)

(58) Field of Classification Search
CPC .............. C08G 63/08; C08J 2201/024; C08J 2201/026; C08J 2201/03; C08J 2203/06;
(Continued)

(56) References Cited

U.S. PATENT DOCUMENTS 9,029,481 B2  5/2015  Nemoto et al.
9,127,118 B2  9/2015  Santo et al.
(Continued)

FOREIGN PATENT DOCUMENTS

JP  H09-263651  10/1997
JP  2001-335626  12/2001
(Continued)

OTHER PUBLICATIONS

Chinese Office Action dated Jan. 20, 2023, in Chinese Application No. 202111374398.1, with English translation, 15 pages.
(Continued)

*Primary Examiner* — Lawrence D Ferguson
(74) *Attorney, Agent, or Firm* — Grüneberg and Myers PLLC

(57) ABSTRACT

Provided is a foam sheet includes a composition including polylactic acid. The polylactic acid includes, as monomer units, D-lactic acid and L-lactic acid, and an amount of the D-lactic acid or the L-lactic acid in the polylactic acid is 98 mol % or greater. An amount of the polylactic acid is 98% by mass or greater relative to a total amount of organic matter in the foam sheet. Bulk density of the foam sheet is 0.063 g/cm$^3$ or greater but 0.125 g/cm$^3$ or less.

15 Claims, 3 Drawing Sheets

(51) Int. Cl.
*C08J 9/00* (2006.01)
*C08J 9/12* (2006.01)
*C08K 3/36* (2006.01)

(52) U.S. Cl.
CPC .............. *C08K 3/36* (2013.01); *C08J 2203/06* (2013.01); *C08J 2367/04* (2013.01)

(58) Field of Classification Search
CPC ........ C08J 2367/04; C08J 5/18; C08J 9/0066; C08J 9/122; C08K 2003/2241; C08K 3/22; C08K 3/36; C08L 67/04
See application file for complete search history.

(56) References Cited

U.S. PATENT DOCUMENTS

| | | | |
|---|---|---|---|
| 9,346,915 | B2 | 5/2016 | Nemoto et al. |
| 9,469,723 | B2 | 10/2016 | Osaka et al. |
| 9,587,072 | B2 | 3/2017 | Nemoto et al. |
| 2005/0032924 | A1 | 2/2005 | Taruno et al. |
| 2007/0141286 | A1 | 6/2007 | Takase et al. |
| 2011/0008609 | A1 | 1/2011 | Nakamura et al. |
| 2011/0218301 | A1 | 9/2011 | Nemoto et al. |
| 2011/0218313 | A1 | 9/2011 | Mase et al. |
| 2011/0263732 | A1 | 10/2011 | Ramesh et al. |
| 2012/0065357 | A1 | 3/2012 | Yamauchi et al. |
| 2012/0295188 | A1 | 11/2012 | Nakajima et al. |
| 2013/0202996 | A1 | 8/2013 | Yamauchi et al. |
| 2014/0163194 | A1 | 6/2014 | Nemoto et al. |
| 2014/0200326 | A1 | 7/2014 | Yamauchi et al. |
| 2014/0213754 | A1 | 7/2014 | Nemoto et al. |
| 2014/0342286 | A1 | 11/2014 | Yamauchi et al. |
| 2014/0350209 | A1 | 11/2014 | Nemoto et al. |
| 2014/0363598 | A1 | 12/2014 | Hoekstra et al. |
| 2014/0371420 | A1 | 12/2014 | Mase et al. |
| 2015/0011724 | A1 | 1/2015 | Nemoto et al. |
| 2015/0031827 | A1 | 1/2015 | Nozaki et al. |
| 2015/0141611 | A1 | 5/2015 | Satoh et al. |
| 2015/0225512 | A1 | 8/2015 | Nemoto et al. |
| 2015/0322201 | A1 | 11/2015 | Arai et al. |
| 2015/0329668 | A1 | 11/2015 | Miyahara et al. |
| 2015/0353677 | A1 | 12/2015 | Izumi et al. |
| 2015/0361213 | A1 | 12/2015 | Kamada et al. |
| 2015/0361214 | A1 | 12/2015 | Nemoto et al. |
| 2016/0083512 | A1 | 3/2016 | Kamada et al. |
| 2016/0280849 | A1 | 9/2016 | Kamada et al. |
| 2016/0297927 | A1 | 10/2016 | Izumi et al. |
| 2020/0339806 | A1 | 10/2020 | Nemoto et al. |
| 2021/0163715 | A1 | 6/2021 | Nemoto |
| 2022/0162377 | A1 | 5/2022 | Hashida et al. |
| 2022/0220279 | A1 | 7/2022 | Nemoto et al. |

FOREIGN PATENT DOCUMENTS

| | | |
|---|---|---|
| JP | 2004-244457 | 9/2004 |
| JP | 2005-145058 | 6/2005 |
| JP | 2006-328225 | 12/2006 |
| JP | 2007-046019 | 2/2007 |
| JP | 2008-231285 | 10/2008 |
| JP | 2009-073955 | 4/2009 |
| JP | 2009-235170 | 10/2009 |
| JP | 2010-070711 | 4/2010 |
| JP | 4573505 | 8/2010 |
| JP | 2010-247510 | 11/2010 |
| JP | 2011-016941 | 1/2011 |
| JP | 2012-017393 | 1/2012 |
| JP | 2012-077151 | 4/2012 |
| JP | 2012-153822 | 8/2012 |
| JP | 2012-188560 | 10/2012 |
| JP | 5207277 | 3/2013 |
| JP | 2013-199640 | 10/2013 |
| JP | 5454137 | 1/2014 |
| JP | 2014-139333 | 7/2014 |
| JP | 2015-083651 | 4/2015 |
| JP | 2015-514819 | 5/2015 |
| JP | 2016-132732 | 7/2016 |
| JP | 2016-166303 | 9/2016 |
| JP | 6077935 | 1/2017 |
| JP | 2020-049922 | 4/2020 |
| JP | 2020-180254 | 11/2020 |
| JP | 2021-116412 | 8/2021 |
| WO | 2020/134041 | 7/2020 |

OTHER PUBLICATIONS

U.S. Appl. No. 17/605,012, filed Apr. 2, 2020.
U.S. Office Action dated Feb. 21, 2023, in U.S. Appl. No. 17/105,815, 16 pages.
U.S. Appl. No. 17/105,815, filed Nov. 27, 2020, 2021/0163715, Taichi Nemoto.
U.S. Office Action dated Aug. 22, 2023, in U.S. Appl. No. 17/530,593, 12 pages.
U.S. Appl. No. 17/530,593, filed Nov. 19, 2021, 2022/0162377, Hashida et al.
Mohammadreza Nofar, "Effects of nano-/micro-sized additives and the corresponding induced crystallinity on the extrusion foaming behavior of PLA using supercritical CO2", Materials and Design, vol. 101, Jul. 5, 2016, pp. 24-34.
Notice of Submission of Publications for Japanese Patent Application No. 2021- 165099, dated Aug. 15, 2023, 26 pages with English Translation.
Office Action received for Japanese Patent Application No. 2021-165099, mailed on Dec. 5, 2023, 10 pages with English Translation.
Wang et al., "Continuous processing of low-density, microcellular poly(lactic acid) foams with controlled cell morphology and crystallinity", Chemical Engineering Science, vol. 75, Jun. 18, 2012, pp. 390-399.
Japanese Publication Submission dated Mar. 15, 2024, in Japanese Application No. 2021-165099, with English translation, 37 pages.
Japanese Office Action dated May 7, 2024, in Japanese Application No. 2021- 165099, 4 pages.
Shen et al., "$CO_2$-solubility of oligomers and polymers that contain the carbonyl group", Polymer, vol. 44, Issue 5, Mar. 2003, pp. 1491-1498.
Saito et al., "Molecular Characterization of Poly (L-Lactic Acid) (PLLA) Isolated Chain", Kobunshi Ronbunshu, vol. 69, No. 7, Jul. 2012, pp. 416-423, with English translation.

FOAM SHEET, PRODUCT, FORMED PRODUCT, AND METHOD FOR PRODUCING FOAM SHEET

CROSS-REFERENCE TO RELATED APPLICATIONS

The present application claims priority under 35 U.S.C. § 119 to Japanese Patent Application No. 2020-194320 filed Nov. 24, 2020 and Japanese Patent Application No. 2021-165099 filed Oct. 6, 2021. The contents of which are incorporated herein by reference in their entirety.

BACKGROUND OF THE INVENTION

Field of the Invention

The present disclosure relates to a foam sheet, a product, a formed product, and a method for producing the foam sheet.

Description of the Related Art

Plastics are processed into various shapes of products, such as bags, and containers, and are widely distributed. However, the majority of the plastic products have properties that are not easily decomposed in the natural world, and therefore disposal thereof after use causes a problem. In recent years, there have been high concerns in the protection of the environment, and therefore developments of materials for replacing non-biodegradable plastics of the plastic products, which are not easily decomposed in the natural world, with biodegradable plastics that are decomposed in the natural world have been actively carried out.

Among biodegradable plastics, polylactic acid has noted as a substitute for non-biodegradable plastics because the polylactic acid has the physical properties similar to the physical properties of polystyrene that has been used as plastics in the art.

As one of embodiments for using polystyrene, there is polystyrene foam to which functions, such as light weight, buffering, and thermal insulation, are imparted by foaming polystyrene, and the polystyrene foam has been widely used. As an alternative material of polystyrene foam considering the environment, polylactic acid foam using polylactic acid, which is biodegradable plastic, has been proposed (see, for example, Japanese Unexamined Patent Application Publication No. 2007-46019, Japanese Patent Nos. 5207277 and 5454137, and Japanese Unexamined Patent Application Publication No. 2006-328225).

Proposed as a method for improving heat resistance of polylactic acid are, for example, a method where polylactic acid is blended with inorganic clay (see Japanese Unexamined Patent Application Publication No. 2004-244457), a method where a stereocomplex, which is a blend of optical isomers of polylactic acid, is used (see Japanese Translation of PCT International Application Publication No. JP-T-2015-514819, and Japanese Unexamined Patent Application Publication Nos. 2012-017393 and 2010-247510), a method where chemical crosslink is introduced into polylactic acid (see Japanese Unexamined Patent Application Publication No. 2013-199640), and a method where polylactic acid forms a complex with an acrylic resin (see Japanese Unexamined Patent Application Publication No. 2012-77151). As a known art, moreover, a method for improving heat resistance by increasing the degree of crystallization of polylactic acid has been known.

SUMMARY OF THE INVENTION

According to an aspect of the present disclosure, a foam sheet includes a composition including polylactic acid. The polylactic acid includes, as monomer units, D-lactic acid and L-lactic acid, and an amount of the D-lactic acid or the L-lactic acid in the polylactic acid is 98 mol % or greater. An amount of the polylactic acid is 98% by mass or greater relative to a total amount of organic matter in the foam sheet. Bulk density of the foam sheet is 0.063 g/cm$^3$ or greater but 0.125 g/cm$^3$ or less.

DESCRIPTION OF THE EMBODIMENTS

Figure 1:
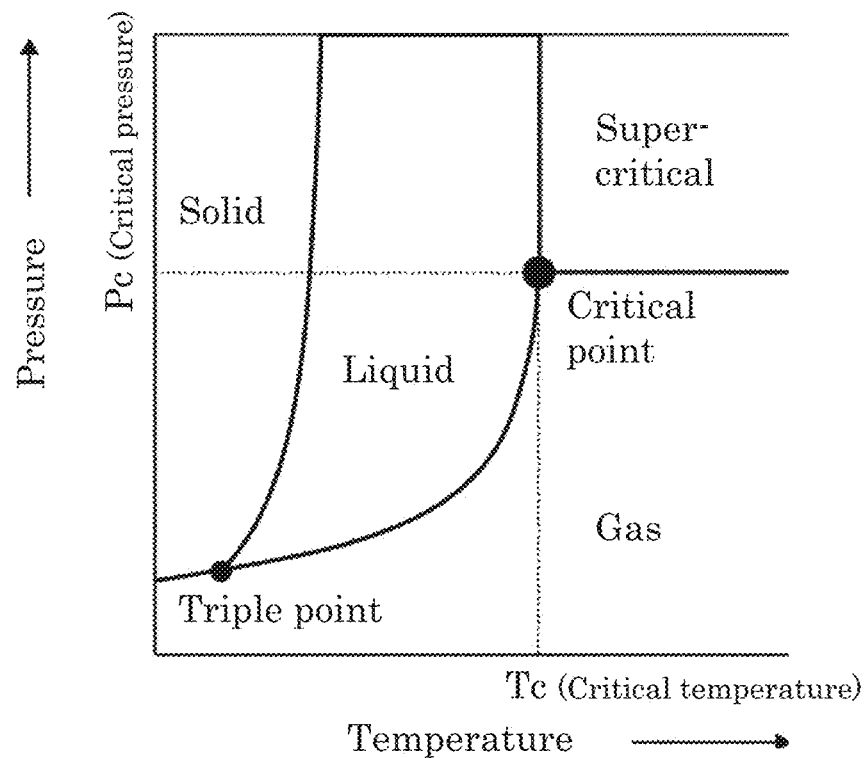
FIG. 1 is a phase diagram illustrating a state of a material relative to a temperature and pressure.

The foam sheet, the product, and the method for producing a foaming sheet according to the present disclosure will be described with reference to drawings hereinafter. The present disclosure is not limited to the embodiments described below. The embodiments may be changed within the range a person skilled in the art can arrive at, such as application of other embodiments, addition to the embodiments, modification of the embodiment, deletion from the embodiments, etc. Any of these embodiments are included in the scope of the present disclosure as long as the functions and effects of the present disclosure are obtained.

The foam sheet of the present disclosure is a foam sheet that includes a composition including polylactic acid. The polylactic acid includes, monomer units. D-lactic acid and L-lactic acid, and an amount of the D-lactic acid or the L-lactic acid in the polylactic acid is 98 mol % or greater. An amount of the polylactic acid is 98% by mass or greater relative to a total amount of organic matter in the foam sheet. A bulk density of the foam sheet is 0.063 g/cm$^3$ or greater but 0.125 g/cm$^3$ or less.

The present disclosure has an object to provide a foam sheet having sufficient biodegradability, and achieving both heat resistance and a high expansion ratio.

The present disclosure can provide a foam sheet having sufficient biodegradability, and achieving both heat resistance and a high expansion ratio.

In the art, it has been known that use of polylactic acid having high crystallinity is effective for obtaining a formed product having excellent heat resistance, but it is actually difficult to obtain a sheet with a high expansion ratio, because rigidity of the resin increases as the crystallinity increases. When a foam sheet is used as a food container, the higher expansion ratio is more preferable, with proviso that the strength as a structure can be maintained, considering thermal insulation and resource saving. In order to use a polylactic acid foam sheet for a heat resistant food container, therefore, both a high expansion ratio and heat resistance are desired.

It has been pointed out that polylactic acid has generally low heat resistance as glass transition temperature of the polylactic acid is low, i.e., about 60° C. When polylactic acid is used for a food container, for example, the polylactic acid food container may cause problems, such as deformation and formation of holes, at the time when the container is exposed to hot water, or the container is heated in a microwave to prepare food.

In connection with the disclosure of Japanese Unexamined Patent Application Publication Nos. 2004-244457, 2013-199640, and 2012-77151, the composition of the polylactic acid container is ideally composed only of a biodegradable plastic or composed of a composition that is close to a biodegradable plastic as much as possible, considering processing after use of the polylactic acid container, such as compost, burning, and recycling. Moreover, introduction of a crosslink structure is preferably as little as possible because the crosslink structure may reduce biodegradability. Accordingly, the proposals are not satisfactory as a method for obtaining a polylactic acid food container having sufficient biodegradability and heat resistance.

In connection with the disclosure of Japanese Translation of PCT International Application Publication No. JP-T-2015-514819, and Japanese Unexamined Patent Application Publication Nos. 2012-017393 and 2010-247510, moreover, the method using the stereocomplex cannot be realistic because poly-(D)-lactic acid is currently very expensive and therefore the polylactic acid food container cannot be commercially provided as disposable food containers.

According to the present disclosure, in contrast, a foam sheet having sufficient biodegradability and achieving both heat resistance and a high expansion ratio can be provided. Since the foam sheet of the present disclosure includes a composition including polylactic acid, the foam sheet of the present disclosure may be also referred to as a polylactic acid foam sheet, or a polylactic acid composition foam sheet. Although the details of the foam sheet will be described later, the foam sheet of the present disclosure has excellent heat resistance, and can be used, for example, for a heat resistant food container. The polylactic acid composition foam sheet is a sheet obtained by foaming a composition including polylactic acid and forming the composition into a sheet.

(Foam Sheet)

The foam sheet of the present disclosure includes a composition including polylactic acid. The composition includes polylactic acid, and may further include filler. The composition may denote a composition that is in the state before being foamed. Since the composition includes polylactic acid, the composition may be referred to as a polylactic acid composition. The composition may further include other components, such as a cross-linking agent, according to the necessity.

The present inventors have diligently conducted researches in order to solve the above-described problems. As a result, the present inventors have found that the above-described problems can be solved by adjusting polylactic acid (may be referred to as a polylactic acid-based resin, or a polylactic acid resin) of high optical purity to an appropriate viscosity in a temperature range in which crystallization occurs mildly, and finely foaming such polylactic acid. Based on the insight as mentioned, the present disclosure has been accomplished.

The foam sheet of the present disclosure is preferably obtained by finely foaming the polylactic acid-based resin of high optical purity at a high expansion ratio. The fine foaming effectively acts on elongational crystallization owing to elongational deformation of cell surfaces, and therefore a sheet having excellent heat resistance can be obtained. Since a foam sheet having fine cell diameters has a low thermal conductivity, moreover, the sheet having excellent heat resistance can be obtained.

Generally, polylactic acid has low viscosity at a temperature adjacent to a melting point of the polylactic acid, and therefore coalescence of cells, or defoaming tends to occur. Accordingly, it is fundamentally difficult to achieve fine cell diameters and a high expansion ratio with polylactic acid. The polylactic acid foam sheet is disclosed in Japanese Unexamined Patent Application Publication Nos. 2007-46019 and 2006-328225, but such polylactic acid foam sheet known in the art does not satisfy the above-described demands, such as fine cell diameters and a high expansion ratio. Particularly, the fine foam body disclosed in Japanese Unexamined Patent Application Publication No. 2006-328225 uses carbon dioxide as a foaming agent to give a cell diameter of 1 μm or less, but the foam body is produced by a batch device that is configured to foam a polymer at a temperature equal to or lower than a melting point of the polymer, and industrial mass-production thereof with a continuous process cannot be achieved.

<Polylactic Acid>

Since a polylactic acid resin is biodegradable by microorganism, the polylactic acid resin has attracted attentions as an environmentally friendly polymer material that gives low environmental load (see "Structure and physical properties of aliphatic polyester, Biodegradable Polymer 2001, Vol. 50, No. 6, pp. 374-377").

Examples of the polylactic acid include a copolymer of D-lactic acid and L-lactic acid, a homopolymer of D-lactide (D-lactic acid) or L-lactide (L-lactic acid), and a ring-opening polymer of one or two or more lactides selected from D-lactide (D-lactic acid), L-lactide (L-lactic acid), and DL-lactide. The above-listed examples may be used alone or in combination. Moreover, the polylactic acid may be appropriately synthesized for use, or may be selected from commercial products.

When a copolymer of D-lactic acid and L-lactic acid or a ring-opening polymer of lactide that is at least one or two selected from the group consisting of D-lactide, L-lactide, and DL-lactide is used as the polylactic acid, for example, crystallinity thereof tends to increase and a melting point or crystallization speed tends to increase, as the amount of the minor optical isomer decreases. The minor optical isomer is the optical isomer (e.g., D-lactic acid or L-lactic acid) an amount of which is smaller than an amount of the other optical isomer (e.g., L-lactic acid or D-lactic acid). As the amount of the minor optical isomer increases, moreover, the copolymer or ring-opening polymer tends to decrease crystallinity thereof, and eventually turns amorphous.

In the present disclosure, an amount of the D-lactic acid or L-lactic acid as a monomer unit in the polylactic acid is 98 mol % or greater in the polylactic acid included in the composition because it is important to impart sufficient heat resistance through crystallization occurred by growth of foam during forming. Therefore, polylactic acid including, as a monomer unit, only one of D-lactic acid or L-lactic acid may be used. When the amount of the D-lactic acid or L-lactic acid in the polylactic acid is not within the above-mentioned range, desirable heat resistance may not be obtained. Optionally, the range of the amount thereof may be greater than 98 mol %.

Whether the amount of the D-lactic acid or L-lactic acid as a monomer unit in the polylactic acid is 98 mol % or greater in the polylactic acid of the foam sheet can be confirmed by liquid chromatography using an optically active column.

The measurement is performed as follows.

The foam sheet is frozen and pulverized to prepare a powder of the foam sheet. The foam sheet powder is collected in an Erlenmeyer flask by 200 mg, and 30 mL of a 1N sodium hydroxide aqueous solution is added to the powder. Next, the resultant mixture is heated to 65° C. with shaking the Erlenmeyer flask to dissolve the polylactic acid completely. Subsequently, the pH of the resultant solution is adjusted to from 4 through 7 with 1N hydrochloric acid, followed by diluting to the predetermined volume using a volumetric flask, to thereby obtain a polylactic acid solution.

Next, the polylactic acid solution is filtered with a membrane filter of 0.45 μm, followed by analyzing through liquid chromatography. Based on the obtained chart, an area ratio is calculated from peaks derived from D-lactic acid and L-lactic acid. The area ratio is used as the abundance ratio to calculate an amount of the D-lactic acid and an amount of the L-lactic acid. The above-described operation is performed 3 times. The arithmetic means of the obtained values are calculated and determined as the amounts of the D-lactic acid and the L-lactic acid that are monomer units of the polylactic acid included the foam sheet.

The measuring device and measuring conditions are as follows.
HPLC device (liquid chromatography): product name "PU-2085 Plus System", available from JASCO Corporation
Column: product name "SUMICHIRALOA5000" (4.6 mm (diameter)×250 mm), available from Sumika Chemical Analysis Service, Ltd.
Column temperature: 25° C.
Mobile phase: a mixed liquid of a 2 mM $CuSO_4$ aqueous solution and 2-propanol ($CuSO_4$ aqueous solution:2-propanol (volume ratio)=95:5)
Mobile phase flow rate: 1.0 mL/min
Detector: UV 254 nm
Injection amount: 20 μL The above-described measurement is performed on the foam sheet. When the larger area between the peak area of the peak derived from the D-lactic acid and the peak area of the peak derived from the L-lactic acid is 98% or greater relative to a total area of the peaks derived from D-lactic acid and the L-lactic acid, it can be determined that the amount of the D-lactic acid or L-lactic acid of the lactic acids constituting the polylactic acid is 98 mol % or greater. Moreover, it can be said that the polylactic acid satisfies the above-described condition, when the optical purity is 98% or greater.

In the present specification, the term "crystallinity" has a broad meaning including a crystallization degree and a crystallization speed, and the crystallinity being high means that the crystallization degree is high, and/or the crystallization speed is fast.

Considering biodegradability and recycling performance (i.e. easiness of recycling), an amount of the polylactic acid relative to a total amount of organic matter in the foam sheet is 98% by mass or greater. When the amount of the polylactic acid relative to the total amount of the organic matter in the foam sheet is 98% by mass or greater, a problem, such as components that are not biodegradable being remained after biodegrading the polylactic acid, can be prevented. When the amount of the polylactic acid relative to the total amount of the organic matter in the foam sheet is less than 98% by mass, moreover, desirable biodegradability cannot be obtained.

The majority of the organic matter in the foam sheet is the polylactic acid, and examples of the organic matter other than the polylactic acid include an organic nucleating agent (may be also referred to as organic filler), and a cross-linking agent. When an inorganic nucleating agent (may be also referred to as inorganic filler) is used as filler, the inorganic nucleating agent is not classified as the organic matter.

—Measuring Method of Amount of Polylactic Acid—

The amount (proportion) of the polylactic acid can be calculated from the proportions of the raw materials. If the blending ratio of the raw materials is unknown, for example, the following GCMS is performed, and the result is compared to the standard sample using the known polylactic acid to thereby determine components. Optionally, the calculation can be performed in combination with a spectrum area ratio determined by NMR, or other analysis methods.

[Measurement by GCMS]
GCMS: QP2010, available from Shimadzu Corporation, (accessory) Py3030D, available from Frontier Laboratories Ltd.
Separation column: Ultra ALLOY UA5-30M-0.25F, available from Frontier Laboratories Ltd.
Sample heating temperature: 300° C.
Column oven temperature: 50° C. (retained for 1 minute), heated at 15° C./min. 320° C. (retained for 6 minutes)
Ionization method: electron ionization (E.I.) method
Detection mass range: from 25 through 700 (m/z)

An amount of the organic filler can be also determined by GCMS in the similar manner.

<<Total Amount of Organic Matter and Amount of Inorganic Filler>>

A total amount of the organic matter in the foam sheet can be estimated as an amount of the foam sheet excluding the mineral content (=an amount of inorganic components). Moreover, the mineral content can be regarded as an amount of the inorganic filler. The mineral content is determined as the residues when the foam sheet is burned at 600° C. for 4 hours.

The mineral content is measured in the following manner. A weight of a 100 mL crucible is weighted by a precision balance up to the fourth place after the decimal point. The foam sheet sample is collected in the crucible by about 3 g, and a total weight of the crucible and the sample is measured. The crucible is placed in Muffle Furnace FP-310, available from Yamato Scientific Co., Ltd., to burn at 600° C. for 4 hours to burn the organic components. Thereafter, the crucible is cooled for 1 hour in a desiccator, and the weight of the crucible is weighed again to measure the total weight of the crucible and the mineral content.

The mineral content, i.e., the amount of inorganic filler, and the total amount of organic matter are calculated according to the following equations.

$$\text{Inorganic filler amount [\%]} = \text{mineral content [\%]} = (\text{a total weight [g] of crucible and sample after burning and cooling} - \text{a weight [g] of crucible})/(\text{a total weight [g] of crucible and sample before burning} - \text{a weight [g] of crucible}) \times 100$$

$$\text{A total amount of organic matter [\%]} = 100 - \text{mineral content [\%]}$$

The above-described measurement is performed with n=2, and the average value is determined.

<Filler>

The filler (may be also referred to as a "foam nucleating agent") is added to adjust diameters of cells and number density of cells, or to improve crystallinity.

Examples of the filler include an inorganic nucleating agent, and an organic nucleating agent. The above-listed examples may be used alone or in combination.

Examples of the inorganic nucleating agent include talc, kaolin, calcium carbonate, sheet silicate, zinc carbonate, wollastonite, silica, alumina, magnesium oxide, titanium oxide, calcium silicate, sodium aluminate, calcium aluminate, sodium aluminosilicate, magnesium silicate, glass balloons, carbon black, zinc oxide, antimony trioxide, zeolite, hydrotalcite, metal fiber, metal whiskers, ceramic whiskers, potassium titanate, boron nitride, graphite, glass fiber, and carbon fiber.

Examples of the organic nucleating agent include polymers found in nature, such as starch, cellulose nanofiber, cellulose particles, wood meal, soy pulp, rice husk, and bran, and modified products thereof, glycerin compounds, sorbitol compounds, benzoic acid and metal salts thereof, phosphoric acid ester metal salts, and rosin compounds.

Among the above-listed examples, as inorganic nucleating agents, titanium oxide, and sheet silicate are more preferable because dispersion is efficiently performed with a small amount thereof to be added, to thereby reduce environmental loads.

Considering a large surface area relative to an amount of the filler added and reduction in the amount thereof for use, the number average length of the filler in the minor axial direction is preferably 100 nm or less.

An amount of the filler in the foam sheet is preferably 3% by mass or less. When the amount of the filler is greater than 3% by mass, the physical properties of the polylactic acid composition foam sheet may be hard and brittle. The amount of the filler that is not biodegradable is preferably as small as possible, and the amount thereof in the foam sheet is preferably 1% by mass or less.

<Other Components>

Other components are not particularly limited as long as the components are components typically contained in a foam sheet, and may be appropriately selected depending on the intended purpose. Examples thereof include a cross-linking agent.

<<Cross-Linking Agent>>

The cross-linking agent is not particularly limited as long as the cross-linking agent is a compound that is reactive with a hydroxyl group and/or carboxylic acid group of the polylactic acid. For example, an epoxy-based cross-linking agent (a cross-linking agent including an epoxy group) or an isocyanate-based cross-linking agent (a cross-linking agent including an isocyanate group) is preferably used. As the cross-linking agent, for example, an epoxy functional (meth)acryl-styrene-based cross-linking agent including 2 or more epoxy groups per molecule, or polyisocyanate including 2 or more isocyanate groups per molecule is preferable. An epoxy functional (meth)acryl-styrene-based cross-linking agent including 3 or more epoxy groups per molecule, or polyisocyanate including 3 or more isocyanate groups per molecule is more preferable because a branch structure can be introduced into polylactic acid, melt strength is effectively improved, and unreacted residues can be reduced. Use of the above-listed cross-linking agent can suppress coalescence of cells and foam breaking, and improve an expansion ratio.

The epoxy functional (meth)acryl-styrene-based cross-linking agent having 2 or 3 or more epoxy groups per molecule is a polymer obtained by copolymerizing a (meth)acryl monomer including an epoxy group and a styrene monomer.

Examples of the (meth)acryl monomer including an epoxy group include monomers including a 1,2-epoxy group, such as glycidyl acrylate, glycidyl methacrylate. Moreover, examples of the styrene monomer include styrene, and α-methyl styrene.

The epoxy functional (meth)acryl-styrene-based cross-linking agent including 2 or more epoxy groups per molecule may include, as a copolymer component, a (meth)acryl monomer that does not include an epoxy group. Examples of the (meth)acryl monomer include methyl acrylate, ethyl acrylate, propyl acrylate, butyl acrylate, cyclohexyl acrylate, methyl methacrylate, ethyl methacrylate, propyl methacrylate, butyl methacrylate, and cyclohexyl methacrylate.

Examples of the polyisocyanate including 2 or more isocyanate groups per molecule include: aliphatic diisocyanate, such as 1,6-hexamethylene diisocyanate, 3-isocyanate-methyl-3,5,5-trimethylcyclohexylisocyanate (isophorone diisocyanate), 1,4-tetramethylene diisocyanate, 2,4,4-trimethylhexamethylene diisocyanate, 2,2,4-trimethylhexamethylene diisocyanate, dicyclohexylmethane-4,4'-diisocyanate, methylcyclohexyl-2,4-diisocyanate, methylcyclohexyl-2,6-diisocyanate, xylylene diisocyanate, 1,3-bis(isocyanate)methylcyclohexane, tetramethylxylylene diisocyanate, trans-cyclohexane-1,4-diisocyanate, and lysine diisocyanate; alicyclic polyisocyanate, such as isophorone diisocyanate, hydrogenated diphenylmethane diisocyanate, hydrogenated tolylene diisocyanate, hydrogenated xylylene diisocyanate, hydrogenated tetramethylxylylene diisocyanate, and cyclohexane diisocyanate; aromatic diisocyanate, such as 2,4-toluylenediisocyanate, 2,6-toluylenediisocyanate, diphenylmethane-4,4'-isocyanate, 1,5'-naphthenediisocyanate, tricine diisocyanate, diphenylmethylmethane diisocyanate, tetraalkyldiphenylmethane diisocyanate, 4,4'-dibenzyldiisocyanate, and 1,3-phenylene diisocyanate; triisocyanate compounds, such as lysine ester triisocyanate, triphenylmethane triisocyanate, 1,6,11-undecanetriisocyanate, 1,8-isocyanate-4,4-isocyanatemethyloctane, 1,3,6-hexamethylene triisocyanate, bicycloheptane triisocyanate, adducts of trimethylolpropane and 2,4-toluylenediisocyanate, and adducts obtained by reacting trimethylolpropane with diisocyanate, such as 1,6-hexamethylene diisocyanate; and modified polyisocyanate compounds obtained by reacting polyvalent alcohol (e.g., glycerin, and pentaerythritol) with the aliphatic diisocyanate compound, the aromatic diisocyanate compound, or the triisocyanate compound. The above-listed examples may be used alone or in combination.

An amount of the cross-linking agent added varies depending on a molecular weight or molecular weight distribution of polylactic acid for use. When the amount of the polylactic acid having a low molecular weight is large, a large amount of the cross-linking agent needs to be added in order to impart melt strength suitable for foaming. However, biodegradability and crystallinity tend to be lowered as the amount of the cross-linking agent increases. Therefore, the amount of the cross-linking agent in the foam sheet of the present disclosure is preferably 2% by mass or less, relative to 100% by mass of a total amount of the polylactic acid and the cross-linking agent.

As other cross-linking agents, a compound having 2 or more oxazoline groups per molecule, a compound having 2 or more carbodiimide groups (polycarbodiimide-based cross-linking agent), etc., may be used.

Examples of other methods for imparting melt strength in order to impart melt strength suitable for foaming (i.e., methods for imparting melt tension) include: a method where sheet silicate or a fibrous foam nucleating agent is dispersed in nano-scale; a method where a resin composition is crosslinked using a cross-linking agent or a crosslinking aid etc.; a method where a resin composition is crosslinked by electron beams, etc.; a method where another resin composition having high melt tension is added; and a method where a foaming temperature is reduced.

<<Other Components>>

In addition to the components above, as other components, additives, such as a heat stabilizer, an antioxidant, and a plasticizer, may be used. The above-listed components may be used alone or in combination.

Considering desirable recycling performance, an amount of the above-mentioned other components is preferably 2% by mass or less, relative to a total amount of the organic matter in the foam sheet.

<Physical Properties of Foam Sheet>

<<Bulk Density>>

The bulk density of the foam sheet of the present disclosure is 0.063 g/cm$^3$ or greater but 0.125 g/cm$^3$ or less. When the bulk density of the foam sheet is within the above-mentioned range, a desirable high expansion ratio can be obtained, and moreover desirable strength and heat resistance can be obtained. When the bulk density of the foam sheet is less than 0.063 g/cm$^3$, heat resistance or strength may be insufficient. When the bulk density of the foam sheet is greater than 0.125 g/cm$^3$, the forming expansion ratio is not sufficiently high.

The expansion ratio can be also represented by:

Expansion ratio=true density/bulk density

As the bulk density is smaller (the expansion ratio is larger), a weight of a formed product can be made smaller as long as it is the same shape, which is preferable considering resource saving.

The bulk density of the foam sheet is preferably 0.063 g/cm$^3$ or greater but 0.083 g/cm$^3$ or less. When the bulk density of the foam sheet is within the above-mentioned range, the foam sheet having excellent balance between strength as a structure and heat resistance can be obtained.

Examples of a method for adjusting the bulk density of the foam sheet to the range defined in the present disclosure include: a method where an amount of the foaming agent is adjusted within the below-mentioned range; a method where an amount of the cross-linking agent is adjusted to adjust, for example, a melt flow rate to the below-mentioned range; and a method where a temperature of the composition at the time of foaming is adjusted. The bulk density tends to reduce as the amount of the foaming agent increases, as long as the amount of the foaming agent is within the range by which the defoaming agent is not lost by defoaming. The bulk density tends to reduce as the melt flow rate decreases, as long as the melt flow rate is within the below-mentioned range, because loss of the foaming agent due to defoaming can be prevented. The bulk density tends to reduce as the temperature of the composition at the time of foaming lowers, as long as the temperature thereof is within the range by which the composition does not lose fluidity due to crystallization or glass transition, because loss of the foaming agent due to defoaming can be prevented. Moreover, the melt flow rate tends to decrease, as the amount of the cross-linking agent increases, as long as the amount of the cross-linking agent is within the below-mentioned range.

The bulk density of the foam sheet of the present disclosure is measured in the following manner. The foam sheet is left to stand for 24 hours or longer in the environment having a temperature of 23° C. and relative humidity of 50%. Then, a test piece in the size of 50 mm×50 mm is cut out from the foam sheet. The bulk density of the cut-out test piece is determined by means of an automatic gravimeter (e.g., DSG-1, available from Toyo Seiki Seisaku-sho, Ltd.) according to the in-water weighing method. A weight (g) of the foam sheet in the atmosphere is weighed, and then a weight (g) of the foam sheet in water is weighed to calculate the bulk density according to the following formula.

Bulk density [g/cm$^3$]=weight of sample in atmosphere [g]/{(weight of sample in atmosphere [g]−weight of sample in fluid [g])×density of fluid [g/cm$^3$]}

<<Basis Weight>>

When the foam sheet has a uniform thickness, the basis weight of the foam sheet of the present disclosure is calculated by the following equation. When the foam sheet does not have a uniform thickness, for example, the foam sheet is cut into a square in the size of 5 cm×5 cm to prepare a plate sample piece, a weight thereof is measured, and a basis weight is determined as:

Basis weight [g/m$^2$]=weight of plate test piece [g]/0.025 [m$^2$].

In this case, 3 or more plate test pieces are prepared from the points that are located at the identical gap between one another in the vertical direction relative to the extrusion direction of the foam sheet. An average value of the obtained values of the test pieces is determined as the basis weight.

Basis weight [g/m$^2$]=1000×bulk density [g/cm$^3$]× sheet thickness [mm]

When a bag, packaging container, tableware, cutlery, stationary, or buffer material including the foam sheet of the present disclosure is produced, as long as the bulk density of the foam sheet is 0.063 g/cm$^3$ or greater but 0.125 g/cm$^3$ or less, a product having excellent light weight can be obtained with the foam sheet having the basis weight, which is calculated by the equation above, of 900 g/m$^2$ or less, more preferably 300 g/m$^2$ or less, a product having excellent heat resistance can be obtained with the foam sheet having the basis weight of 125 g/m$^2$ or greater, and a product having excellent strength can be obtained with the foam sheet having the basis weight of 200 g/m$^2$ or greater, more preferably 250 g/m$^2$ or greater.

<<Biodegradability>>

The foam sheet of the present disclosure has sufficient biodegradability. For example, the biodegradability can be evaluated by determining biodegradation according to JISK6953-2. The biodegradability is preferably biodegradation of 60% or greater within 6 months, and more preferably biodegradation of 60% or greater within 45 days.

<<Volatile Component>>

In the present disclosure, the foam sheet is preferably substantially free from a volatile component. Since the foam sheet is substantially free from a volatile component, adverse effects on human bodies and environment can be reduced, as well as improving size stability. Examples of the volatile component that may be included include an organic solvent, and a foaming agent, such as butane.

In the present disclosure, for example, carbon dioxide ($CO_2$) or nitrogen ($N_2$), which is used as a compressive fluid as described below, may also function as a foaming agent. When a compressive fluid of carbon dioxide or nitrogen is used as a compressive fluid and a foaming agent, the foaming agent is promptly dispersed into the atmosphere from the foam sheet just after the production, and therefore the produced foam sheet is in the state substantially free from a volatile component. In the present specification, the term "substantially" means equal to or lower than the detection limit in the following analysis.

Part of the foam sheet is prepared as a sample. To 1 part by mass of the sample, 2 parts by mass of 2-propanol is added. The resultant mixture is dispersed by ultrasonic waves for 30 minutes, followed by storing for 1 day in a refrigerator (5° C.) to obtain a volatile component extract. The volatile component extract is analyzed by gas chromatography (GC-14A, available from Shimadzu Corporation) to quantify the volatile component in the foam sheet. The measuring conditions are as follows.
Device: Shimadzu GC-14A
Column: CBP20-M 50-0.25
Detector: FID
Injection amount: from 1 μL through 5 μL
Carrier gas: He 2.5 kg/cm$^2$
Hydrogen flow rate: 0.6 kg/cm$^2$
Air flow rate: 0.5 kg/cm$^2$
Chart speed: 5 mm/min
Sensitivity: Range 101×Atten 20
Column temperature: 40° C.
Injection Temp: 150° C.

Specifically, it is preferred that an organic compound having a boiling point of −20° C. or higher but lower than 150° C. at 1 atm be not detected when the following measurement is performed on the foam sheet of the present disclosure.
[Measurement]

Part of the foam sheet is dispersed in a solvent, and the extract liquid of the volatile component is subjected to gas chromatography under the above-described conditions to thereby quantify the organic compound.

As described above, the foam sheet of the present embodiment can use a material other than an organic compound (e.g., $CO_2$) as the foaming agent. In order to design the foam sheet of the present disclosure from which the organic compound is not detected by the above-described measurement, for example, the volatile component content can be made substantially 0% by mass by using $CO_2$ as a foaming agent. Since the foam sheet is a foam sheet from which the organic compound is detected, the foam sheet does not generate odor.

<<Average Cell Diameter>>

When the bulk density of the foam sheet of the present disclosure is 0.063 g/cm$^3$ or greater but 0.083 g/cm$^3$ or less, the average cell diameter of the foam sheet is preferably 100 μm or less. When the bulk density of the foam sheet of the present disclosure is greater than 0.083 g/cm$^3$ but 0.125 g/cm$^3$ or less, the average cell diameter of the foam sheet is preferably 200 μm or less. When the average cell diameter of the foam sheet is within the above-mentioned ranges, the foam sheet having excellent heat resistance can be obtained.

A measurement method of the average cell diameter of the foam sheet is not particularly limited and may be appropriately selected. For example, the foam sheet is cut to expose a cross-section thereof by means of a sharp razor blade (e.g., 76 Razor, available from Nissin EM Co., Ltd.), and the obtained cross-section of the foam sheet is observed by SEM VE-9800, available from KEYENCE CORPORATION. The obtained three cross-section SEM photographs (magnification: 50 times) are each binarized into the gray component corresponding to a cell and the resin component (white) using image analysis software (e.g., Image-Pro Premier, available from Mediacy), and the average cell diameter (Feret's diameter) is determined in the range of 1 mm×1 mm. The average cell diameter of cells having the Feret's diameter of 0.5 μm or greater is calculated.

The average cell diameter can be adjusted by the dispersion state, melt tension etc., and is not limited to the above-mentioned range.

<<Average Thickness>>

The average thickness of the foam sheet of the present disclosure is preferably 0.1 mm or greater but 10 mm or less. When the average thickness of the foam sheet is 10 mm or less, the foam sheet can be easily formed as a sheet. When the average thickness of the foam sheet is 0.1 mm or greater, the strength of the foam sheet as a structure can be secured.

The average thickness of the foam sheet is determined by measuring a thickness at 10 points by means of a caliper (e.g., DigiMax Caliper, available from Mitutoyo Corporation), and calculating an average value of the measured values.

<<Crystallinity>>

The crystallinity of the foam sheet can be determined from the crystal melting peak area and the cooling crystallization peak area, which are values determined by differential scanning calorimetry (DSC) according to Testing Methods for Heat of Transitions of Plastics specified in JISK7122.

For example, DSC can be performed by a differential scanning calorimeter Q-2000 (available from TA Instruments Japan Inc.). A sample (from 5 mg through 10 mg) cut out from the foam sheet is placed in a container of the differential scanning calorimeter, followed by heating from 10° C. to 200° C. at the heating rate of 10° C./min. During the heating, the area corresponding to the exothermic peak observed at about 80° C. through about 130° C. is determined as the cooling crystallization peak area, and the area corresponding to the endothermic peak observed at a temperature higher than the above-mentioned temperature range is determined as the crystal melting peak area.

With the foam sheet in which crystallization is sufficiently progressed, a cooling crystallization peak may not be observed. With the foam sheet in which crystallization is not progressed at all, a crystal melting peak may not be observed.

The polylactic acid foam sheet of the present disclosure preferably has a value of 20 J/g or greater, more preferably 30 J/g or greater, where the value is a value obtained by subtracting the cooling crystallization peak area as measured by differential scanning calorimetry (DSC) from the crystal melting peak area as measured by DSC. The foam sheet having such a value can exhibit desirable heat resistance.

Examples of a method for adjusting the above-mentioned value to 20 J/g or greater include a method where the bulk density of the foam sheet is adjusted to the range of 0.063 g/cm$^3$ or greater but 0.125 g/cm$^3$ or less, and the average cell diameter of the foam sheet is adjusted to the following range depending on the bulk density thereof. When the bulk density of the foam sheet is 0.063 g/cm$^3$ or greater but 0.083 g/cm$^3$ or less, for example, the average cell diameter is preferably adjusted to 100 μm or less. When the bulk density of the foam sheet is greater than 0.083 g/cm$^3$ but 0.125 g/cm$^3$ or less, for example, the average cell diameter is preferably adjusted to 200 μm or less. Moreover, the foam nucleating agent is preferably added because crystallization can be facilitated.

<<Weight Average Molecular Weight>>

The foam sheet of the present disclosure preferably includes a crosslinked polymer obtained through a reaction between the polylactic acid and the cross-linking agent. In this case, the weight average molecular weight (Mw) of the crosslinked polymer (may be also referred to as a polylactic acid-containing crosslinked polymer) is preferably from 200,000 through 400,000, and more preferably from 250,000 through 350,000. When the weight average molecular weight thereof is 200,000 or greater, hydrolysis resistance can be improved, and a reduction in the molecular weight when the foam sheet is immersed in warm water can be prevented. When the weight average molecular weight thereof is 400,000 or less, moreover, increase in the melt viscosity can be suppressed, and therefore desirable ejectability of the melted resin can be obtained.

A method for measuring the weight average molecular weight of the crosslinked polymer is not particularly limited and may be appropriately selected depending on the intended purpose. For example, the weight average molecular weight thereof can be measured by gel permeation chromatography (GPC). For example, the foam sheet is placed in a tetrahydrofuran (THF) solution, and is heated to 65° C. to dissolve the polylactic acid. Subsequently, the resultant solution is filtered with a membrane filter of 0.45 μm, and the obtained solution is provided to the measurement.

The foam sheet of the present disclosure preferably has a melt flow rate (MFR) of 0.3 g/10 min or greater but 5 g/10 min or less at a test temperature of 190° C. with load of 2.16 kg. When the MFR is within the above-mentioned range, appropriate fluidity can be secured during a foaming process, and crystallization is advantageously progressed at the time of foaming. The MFR is more preferably 3 g/10 min or less because coalescence of cells, defoaming, and crystallization speed can be controlled.

For example, the MFR can be measured by means of MELT FLOW INDEX TESTER 120-SAS (available from YASUDA SEIKI SEISAKUSHO, LTD.) according to the method B, "Plastics-Determination of the melt mass-flow rate (MFR) and melt volume-flow rate (MVR) of thermoplastics-Part 1" of JIS K7210-1:2014.

The measuring conditions are as follows.

The foam sheet is frozen and pulverized to prepare a sample. The obtained sample is vacuum dried for 4 hours at 80° C., and the resultant sample is provided to the measurement. The measurement is preformed 3 times using from 3 g through 8 g of the sample, under the conditions that the pre-heating is performed for 300 seconds, the load hold is performed for 30 seconds, the test temperature is set to 190° C., and the load is set to 2.16 kg (21.18 N). The arithmetic mean of the measured values is used as a value of MFR (g/10 min).

(Product)

The foam sheet of the present disclosure may be used as it is, or may be used as a product. Since the sheet of the present disclosure has excellent light-weight and heat resistance, the sheet is suitably used for containers for food and tableware. Moreover, the sheet is suitably used for heat resistant food containers. However, use of the sheet is not limited to the above-mentioned examples. Moreover, printing may be directly performed on the foam sheet of the present disclosure.

The product using the foam sheet of the present disclosure is not particularly limited and may be appropriately changed. The product of the present disclosure includes the foam sheet of the present disclosure and may further include other components according to the necessity. The above-mentioned other components are not particularly limited as long as the components are components typically used for resin products, and may be appropriately selected depending on the intended purpose.

The foam sheet of the present disclosure may be processed into the product of the present disclosure. The processing of the foam sheet is not particularly limited. For example, the foam sheet may be subjected to a process for processing the foam sheet using a mold to produce a product. The method for processing the sheet using the mold is not particularly limited, and may be selected from any of methods for thermoplastic resins known in the art. Examples thereof include vacuum molding, pressure forming, vacuum pressure forming, and press molding.

Examples of the product (may be also referred to as a "consumer product") include household products, such as bags, packaging containers, trays, tableware, cutlery, and stationary, and buffer materials. The term "product" includes not only a whole material in the form of a sheet or roll to be processed into a product, and a product per se, but also a product including parts, such as handles of a tray, or a product such as a tray to which handles are attached.

Examples of the bag include plastic bags, shopping bags, and bin liners.

Examples of the stationary include clear files, and patches.

Conventional foam sheets have a problems in physical properties, such as strength and flexibility of sheets, because a diameter of cells of foam is large, and a variation in the size of cells is large.

The product obtained by molding the foam sheet of the present disclosure has excellent physical properties, thus the product can be widely applied for applications, such as industrial materials, sheets for agricultural products, food products, medical products, and cosmetic products, and wrapping materials.

The foam sheet of the present disclosure is effective for use utilizing biodegradability of the foam sheet, particularly as wrapping materials for food products, and medical sheets for cosmetic products or medical products. The improvement in performance thereof can be expected by reducing a thickness of the foam sheet etc.

<Formed Product>

As one example of the product, moreover, the foam sheet may be processed into a formed product. The formed product of the present disclosure is obtained by thermoforming the foam sheet of the present disclosure. The formed product of the present disclosure has desirable biodegradability, and has excellent light-weight and heat resistance.

A temperature of thermoforming is not particularly limited. For example, the temperature thereof is preferably 60° C. or higher but 300° C. or lower.

(Method for Producing Foam Sheet)

The method for producing a foam sheet of the present disclosure include a kneading step, and a foaming step. The method may further include other steps according to the necessity. The kneading step and the foaming step may be performed simultaneously, or may be performed separately.

<Kneading Step>

The kneading step is a step including kneading polylactic acid at a temperature lower than a melting point of the polylactic acid in the presence of a compressive fluid. Moreover, the amount of D-lactic acid or L-lactic acid of the lactic acids constituting the polylactic acid is preferably 98 mol % or greater, more preferably greater than 98 mol %, in the polylactic acid.

The filler is preferably used in the kneading step. Since the filler is used, heat resistance can be improved. When the filler is used in the kneading step, the polylactic acid and the filler are kneaded at a temperature lower than a melting point of the polylactic acid to obtain a composition.

The cross-linking agent is preferably used in the kneading step. When the cross-linking agent is used in the kneading step, the polylactic acid is kneaded in the presence of a compressive fluid to obtain a composition precursor, and then the cross-linking agent is added to the composition precursor and kneaded in the presence of the compressive fluid, to thereby obtain a composition. An embodiment for adding the cross-linking agent is not particularly limited to the embodiment as mentioned above.

When the filler and the cross-linking agent are used in the kneading step, polylactic acid, filler and a cross-linking agent may be kneaded at once to obtain a composition, or polylactic acid and filler may be kneaded to obtain a composition precursor, and a cross-linking agent may be added to the composition precursor to prepare a composition.

The composition of the present embodiment includes the polylactic acid, and may further include the filler and the cross-linking agent according to the necessity. The composition is in the state before being foamed. Since the composition includes the polylactic acid, the composition may be referred to as a polylactic acid composition. Moreover, the composition precursor may be referred to as a master batch. For example, the composition precursor processed to pelletize may be referred to as a master batch.

As the polylactic acid, filler, and cross-linking agent for use in the kneading step, the above-described polylactic acid, filler, and cross-linking agent may be used, and therefore descriptions thereof are omitted.

<<Compressive Fluid>>

Aliphatic polyester, such as polylactic acid, has characteristics that a melt viscosity thereof is sharply decreased at a melting point thereof or higher. When the aliphatic polyester is kneaded with filler etc., therefore, filler tends to aggregate. The above-mentioned aggregate is significant, particularly when the size of filler particles is small.

In the present disclosure, the polylactic acid is kneaded in the presence of the compressive fluid. Since kneading is performed using the compressive fluid, the filler is easily dispersed in the polylactic acid evenly, when the filler is used for the composition. A reason why use of the compressive fluid is preferably in order to knead the filler and the polylactic acid and to disperse the foam nucleating agent evenly will be described hereinafter.

It has been known that a resin in which a compressive fluid is impregnated generally reduces a melt viscosity of the resin (see "The Latest Applied Technology of Supercritical Fluid" NTS Inc.). In a kneading step, however, the higher melt viscosity of the resin can impart the higher shearing force to the foam nucleating agent, and therefore the higher melt viscosity is preferable in view of dispersibility because aggregates are made fine.

Therefore, it seems that the reduction of the melt viscosity of the resin as a result of permeation of the compressive fluid is contradicted with improvement in kneadability. In fact, there is a case where pressure is applied during kneading with typical filler without using a compressive fluid. However, the application of the pressure during kneading with the filler aims to reduce the free volume of the resin to increase interaction within the resin (increase in the viscosity), and the plasticization of the resin is the opposite effect (see "k. Yang. R. Ozisik R. Polymer, 47. 2849 (2006)").

The present inventors have diligently researched on whether a compressive fluid is utilized for kneading polylactic acid, particularly for kneading polylactic acid and filler together or not. As a result, the present inventors have found that the viscosity of polylactic acid can be adjusted in the presence of a compressive fluid to the viscosity suitable for kneading, as long as a temperature is a temperature lower than a melting point of the polylactic acid, and the filler can be uniformly dispersed therein. In the art, polylactic acid and a foam nucleating agent can be kneaded only in the low melt viscosity range at a temperature equal to or higher the melting point of the polylactic acid. In the present disclosure, however, dispersibility of the foam nucleating agent can be further improved because the polylactic acid and the foam nucleating agent can be kneaded in the highly viscous state at a temperature lower than the melting point of the polylactic acid using a compressive fluid.

Depending on a type of a compressive fluid for use, moreover, the compressive fluid can also function as a foaming agent. When a foam sheet is produced, a foaming agent is generally used. When a compressive fluid of carbon dioxide, nitrogen, etc. is used as a foaming agent in production of a foam sheet formed of a polylactic acid composition, kneading and foaming can be performed in a series of processes. Therefore, such a production process is preferable considering reduction in the environmental load.

Examples of a substance that can be used in the state of a compressive fluid include carbon monoxide, carbon dioxide, dinitrogen monoxide, nitrogen, methane, ethane, propane, 2,3-dimethylbutane, ethylene, and dimethyl ether. Among the above-listed examples, carbon dioxide is preferable because the critical pressure is about 7.4 MPa and the critical temperature is about 31° C., and therefore a supercritical state of carbon dioxide is easily created. In addition, carbon dioxide is non-flammable, and thus it is easily handled. The compressive fluid may be used alone or two or more compressive fluids may be used in combination.

Figure 2:
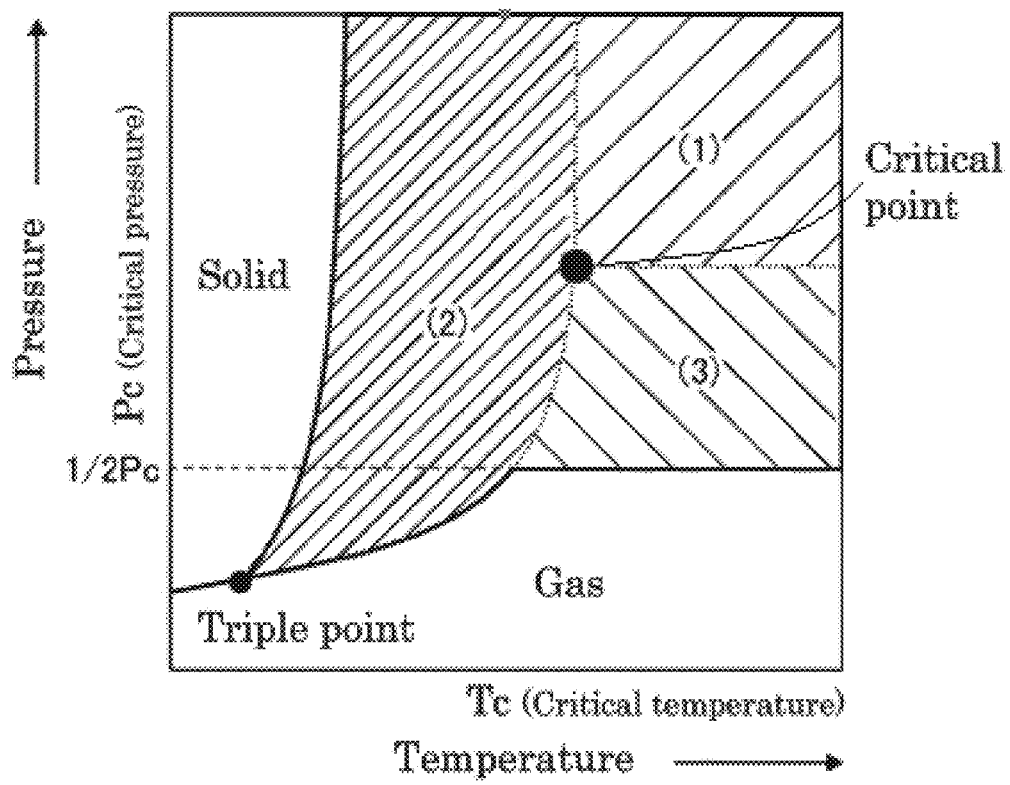
FIG. 2 is a phase diagram for defining a range of a compressive fluid.

The compressive fluid used in the present disclosure will be described with reference to FIGS. 1 and 2. FIG. 1 is a phase diagram illustrating a state of a substance relative to a temperature and pressure. FIG. 2 is a phrase diagram for defining the range of the compressive fluid. In the present embodiment, the term "compressive fluid" means a state of a substance present in any of the regions (1), (2), or (3) of FIG. 2 in the phrase diagram of FIG. 1.

In such regions, the substance is known to have extremely high density and show different behaviors from those known at a room temperature and atmospheric pressure. The substance is in the state of a supercritical fluid, when the state thereof is in the region of (1). The supercritical fluid is a fluid that exists as a non-condensable high-density fluid at a temperature pressure exceeding the limiting point (critical point), at which a gas and a liquid can coexist. The supercritical fluid is a fluid that does not condense even when compressed. The substance is a liquid, when the state thereof is in the region of (2). The substance in the state of the liquid is a liquid gas obtained by compressive the substance in the state of the gas at a room temperature (25° C.) and atmospheric pressure (1 atm). The substance is the in the state of a gas, when the state thereof is in the region of (3). The substance in the state of the gas is a high-pressure gas the pressure of which is ½ of the critical pressure (Pc) or higher, i.e., ½ Pc or higher.

Since the solubility in the compressive fluid varies depending on the combination of a resin for use and the compressive fluid, a temperature, and pressure, a supply amount of the compressive fluid is appropriately adjusted. In case of the combination of polylactic acid and carbon dioxide, for example, a supply amount of the carbon dioxide is preferably 2% by mass or greater but 30% by mass or less, relative to 100% by mass of a composition (including polylactic acid, optionally filler and a cross-linking agent etc.). When the supply amount of the carbon dioxide is 2% by mass or greater, a problem that a plasticizing effect is limited can be prevented. When the supply amount of the carbon dioxide is 30% by mass or less, the following problem can be prevented. That is, separation between the carbon dioxide and the polylactic acid occurs and a foam sheet of a uniform thickness cannot be obtained.

Among the above-listed examples, a compressive fluid of carbon dioxide or nitrogen is preferably used. As described above, the obtained foam sheet is preferably substantially free from a volatile component, and is more preferably substantially free from an organic compound having a boiling point of −20° C. or higher but lower than 150° C. The phrase "substantially free from" means as described in the description of the volatile component associated with the physical properties of the foam sheet. Since a compressive fluid of carbon dioxide, nitrogen, etc. functions as a foaming agent, and another foaming agent is not used as a volatile component, a resultant foam sheet does not generate odor and can be handled safely.

<<Other Foaming Agents>>

In addition to the compressive fluid, another foaming agent may be used. Considering easily forming a foam sheet of a high expansion ratio, examples of another foaming agent include: hydrocarbons, such as lower alkane (e.g., propane, normal-butane, isobutane, normal-pentane, isopentane, and hexane); ethers, such as dimethyl ether; halogenated hydrocarbons, such as methyl chloride, and ethyl chloride; and physical foaming agents, such as a compressive fluid of carbon dioxide or nitrogen. As described above, use of a compressive fluid of carbon dioxide or nitrogen as a foaming agent is preferable.

<<Kneading Device>>

A kneading device for use in the production of the polylactic acid composition may be a device employing a continuous process or a batch process. The kneading device is preferably a device appropriately employing a reaction process, considering efficiency of the device, properties and quality of a product.

As the kneading device, a monoaxial extruder, a biaxial extruder, a kneader, a no-shaft basket stirring chamber, Bivolac available from Sumitomo Heavy Industries, Ltd., N-SCR available from Mitsubishi Heavy Industries, Ltd., a spectacle-shaped blade polymerization reactor available from Hitachi, Ltd., a lattice wing or Kenics-type, Sulzer-type, or SMLX-type static mixer-equipped tube polymerization reactor may be used because such devices can correspond to the viscosity suitable for kneading. Considering color tone, preferable examples thereof include a finisher, which is a self-cleaning polymerization device, N-SCR, and a biaxial extruder. Among the above-listed examples, a finisher and N—SCR are preferable considering production efficiency, color toner of the resin, stability, and heat resistance.

Figure 3:
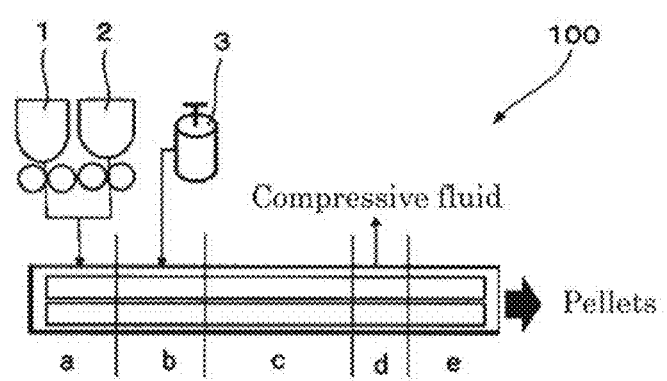
FIG. 3 is a schematic view illustrating one example of a kneading device.

One example of the kneading device is illustrated in FIG. 3. As the illustrated continuous kneading device 100, for example, a biaxial extruder (available from The Japan Steel Works, LTD.) may be used. For example, a screw opening diameter is 42 mm, and L/D=48. In the present embodiment, for example, raw materials, such as polylactic acid, filler, etc., are supplied from the first supply section 1 and the second supply section 2 to the raw material mixing-melting area a, and the supplied raw materials are mixed and melted. To the mixed and melted raw materials, a compressive fluid is supplied from the compressive fluid supply section 3 in the compressive fluid supply area b. Subsequently, the resultant mixture is kneaded in the kneading area c. Next, the compressive fluid is removed in the compressive fluid removing area d, followed by the result is formed into, for example, pellets in the molding area e. In the manner as described above, a master batch can be produced as a composition precursor.

For example, the compressive fluid (fluid material) is supplied by a metering pump, and solid raw materials, such as resin pellets and filler, are supplied by a quantitative feeder.

—Raw Material Mixing-Melting Area—

In the raw material mixing-melting area, the resin pellets and the filler are mixed and heated. The heating temperature is set to a temperature equal to or higher than a melting point of the resin, so that the raw materials are in the state that can be homogeneously mixed with a compressive fluid in the sequential area where the compressive fluid is supplied.

—Compressive Fluid Supplying Area—

In the state where the resin pellets are melted by heating, a compressive fluid is supplied to plasticize the melted resin.

—Kneading Area—

A temperature of the kneading area is set to achieve an appropriate viscosity for kneading with filler. The set temperature is not particularly limited because the set temperature varies depending on the specification of a reaction device for use, a resin for use, a structure and molecular weight of the resin, etc., and may be appropriately changed. In case of commercially available polylactic acid having the weight average molecular weight (Mw) of about 200,000, for example, the typical kneading is performed at a temperature that is higher than the melting point of the polylactic acid by 10° C. through 20° C.

In the present disclosure, in contrast, kneading can be performed at a temperature lower than the melting point of the polylactic acid, and the kneading can be performed with relatively high viscosity at the temperature lower than the melting point of the polylactic acid. Specifically, the temperature is a temperature that is lower than the melting point of the polylactic acid by 0° C. through 60° C., more preferably by 10° C. through 40° C. The temperature may be simply set based on a current value of stirring power of the device, but the above-listed set value is the range, which is only achieved by the present disclosure, and cannot be generally achieved in the art.

<<Foam Sheet Forming Device>>

Next, a foam sheet is produced by a foam sheet forming device. As the foam sheet device, a device listed as the kneading device above may be used. The kneading device and the foam sheet forming device may be one device, or may be separate devices.

Figure 4:
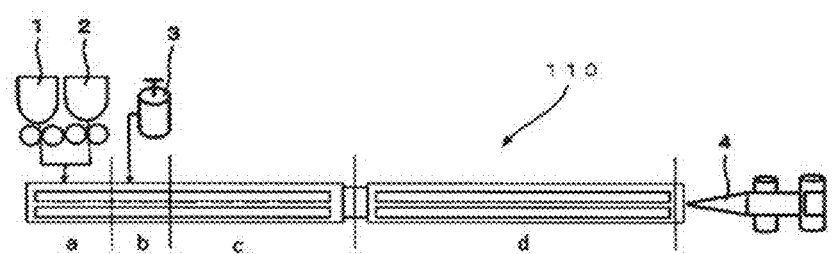
FIG. 4 is a schematic view illustrating one example of a foam sheet forming device.

One example of the foam sheet forming device will be illustrated in FIG. 4. Similarly to the above, for example, a biaxial extruder may be used as the continuous foam sheet forming device 110. In the continuous foam sheet forming device 110, for example, raw materials, such as a master batch, polylactic acid, a cross-linking agent, etc. are supplied from the first supply section 1 and the second supply section 2 to the raw material mixing-melting area a, and the raw materials are mixed and melted. To the mixed and melted raw materials, a compressive fluid is supplied from the compressive fluid supply section 3 in the compressive fluid supply area b.

Subsequently, the resultant mixture is kneaded in the kneading area c, to thereby obtain a composition. Next, the composition is supplied to the heating area d, and is heated and kneaded in the heading area, followed by returning to the atmospheric pressure to extrude and foam the composition. The extruded and foamed foam sheet 4 is wound around a mandrel.

In the continuous foam sheet forming device 110, the raw material mixing-melting area a, the compressive fluid supplying area b, and the kneading area c are also collectively referred to as a first extruder, and the heating area d is referred to as a second extruder. In the present embodiment, the mixed, melted, and kneaded raw materials are extruded into the second extruder by the first extruder, and the foam sheet is extruded and foamed by the second extruder. For example, a circular die may be used in the second extruder.

In the present embodiment, the kneading step is performed by the first extruder including the extruding device and the foam sheet forming device, and the below-mentioned foaming step is performed by the second extruder of the foam sheet forming device. However, the present disclosure is not limited to such a configuration. For example, the areas where the kneading step and the foaming step are performed may be appropriately changed.

<Foaming Step>

The foaming step is a step including removing the compressive fluid to foam the composition (i.e., the polylactic acid composition).

The compressive fluid is gradually exchanged with air in the atmospheric, and thus can be removed from the foam sheet. For example, the compressive fluid can be removed by exposing the composition to the atmosphere. A temperature during the foaming step is preferably a temperature adjacent to the melting point of the polylactic acid resin.

In the foaming step, the compressive fluid dissolved in the composition reduces the solubility thereof by reducing the pressure or elevating the temperature to create supersaturation. As a result, foam nuclei is formed at interfaces mainly with filler particles, the compressive fluid dissolved in the composition is dispersed to grow the foam nuclei into cells, to thereby obtain a foam body. Since foaming occurs with the filler as a starting point, a foam sheet having uniform and fine foam can be produced only when the filler is homogeneously dispersed in polylactic acid. Even when the filler is not used, a foam sheet having uniform and fine foam can be produced because a small amount of crystals generated in the kneading area functions substantially as a foam nucleating agent. However, flowability of the composition reduces as crystallization progresses excessively, and it may be difficult to foam the composition. Therefore, the foam nucleating agent is preferably added.

<Other Steps>

The above-mentioned other steps are not particularly limited. Examples of other steps include performed in production of a typical foam sheet. Examples of thereof include a shaping step for processing into a sheet.

Examples of the shaping step include vacuum molding, pressure forming, and press molding. A sheet-formed product is obtained by the shaping step. Moreover, examples thereof include a step for thermoforming the foam sheet to form a formed product.

EXAMPLES

The present disclosure will be described below by way of Examples. The present disclosure should not be construed as being limited to these Examples.

Example 1

<Production of Foam Sheet>
<<Production of Master Batch>>

By means of the continuous kneader 100 illustrated in FIG. 3, raw materials were mixed and supplied to the melting area a by supplying polylactic acid (REVODE190, available from HISUN) at the flow rate of 9.7 kg/hr, silica (QSG-30, available from Shin-Etsu Chemical Co., Ltd.) serving as filler at the flow rate of 0.3 kg/hr, and carbon dioxide as a compressive fluid at the flow rate of 0.99 kg/h (equivalent to 10% by mass relative to the polylactic acid) to the compressive fluid supply area b, and kneading was performed in the kneading area c. Subsequently, the compressive fluid was removed in the compressive fluid removing area d. As a result, [Polylactic acid composition precursor including 3% by mass of filler] was obtained.

Subsequently, [Polylactic acid composition precursor including 3% by mass of filler] was extruded in the form of strands in a water bath in the molding area e. After cooling with water, the strands were pelletized by a strand cutter, to thereby obtain a master batch including 3% by mass of filler ([3% by mass filler master batch]) as a composition precursor.

The temperature of each zone was set as follows.
Raw materials mixing-melting area a and compressive fluid supply area b: 190° C.
Kneading area c: 150° C.
Compressive fluid removing area d: 190° C.
Molding area e: 190° C.

The pressure of each zone was set as follows.
Zone from compressive fluid supply area b to kneading area c: 7.0 MPa
Compressive fluid removing area d: 0.5 MPa <<Production of Foam Sheet>>

By means of a continuous foam sheet forming device 110 illustrated in FIG. 4, [3% by mass filler master batch] was supplied at the flow rate of 1.67 kg/hr, and the polylactic acid (REVODE190, available from HISUN) was supplied at the flow rate of 8.33 kg/hr was supplied to the raw material mixing-melting area a of the first extruder in a manner that an amount of the filler was to be 0.5% by mass relative to a total amount of the polylactic acid and the foam nucleating agent. Subsequently, an epoxy-based cross-linking agent (Joncryl 4368C, available from BASF) was supplied at the flow rate of 0.05 kg/hr (equivalent to 0.5 parts by mass relative to 100 parts by mass of a total amount of the polylactic acid and the foam nucleating agent) to the raw material mixing-melting area a of the first extruder. Subsequently, carbon dioxide was supplied to the compressive fluid supply area b of the first extruder at the flow rate of 0.99 kg/h (equivalent to 10% by mass relative to a total amount of the polylactic acid, the foam nucleating agent, and the cross-linking agent). The resultant was mixed, melted, and kneaded, and then supplied to a second extruder.

Subsequently, the resultant was kneaded in the heating area d of the second extruder, to thereby obtain a composition (polylactic acid composition). The composition was then discharged from a circular die having a slit diameter of 70 mm attached at the edge of the second extruder at the ejection amount of 10 kg/h, and the composition was cooled down to a temperature of 150° C. to exposing to the atmosphere, to thereby extrude and foam the composition. The cylindrical polylactic acid-based resin foam sheet extruded and formed was disposed along the cooled mandrel, air was blown onto the outer surface of the foam from an air ring to cool, and the resultant was cut open by a cutter knife equipped with a rotatable blade, to thereby obtain a flat sheet of the foam sheet. In the manner as described, a foam sheet of Example 1 was produced.

The temperature of each zone was set as follows.
Raw material mixing-melting area a of first extruder: 190° C.
Compressive fluid supply area b of first extruder: 190° C.
Kneading area c of first extruder: 150° C.
Heating area d of second extruder: 140° C.

The pressure of each zone was set as follows.
Compressive fluid supply area b of first extruder: 7.0 MPa
Kneading area c of first extruder: 7.0 MPa
Heating area d of second extruder: 7.0 MPa.

The physical properties of the obtained foam sheet are presented in Table 1. In Table 1, the proportion of the polylactic acid and the proportion of the cross-linking agent in the organic manner are based on the formula above. Namely, each proportion thereof was calculated from the proportions of the materials added. Moreover, whether the amount (mol %) of D-lactic acid or L-lactic acid constituting the polylactic acid satisfied the range of the present disclosure was confirmed with the L-lactic acid ratio. The same can be said in Tables 2 and 3.

Example 2

A polylactic acid foam sheet was produced in the same manner as in Example 1, except that [3% by mass filler master batch] was replaced with polylactic acid (REVODE190, available from HISUN), and the lip gap of the circular die was changed to adjust the thickness of the foam sheet to be the value presented in Table 1.

Example 3

A polylactic acid foam sheet was produced in the same manner as in Example 1, except that the amount of the cross-linking agent was changed to the value presented in Table 1, the temperature of the heating area d of the second extruder was changed to 150° C., and the lip gap of the circular die was changed to adjust the thickness of the foam sheet to be the value presented in Table 1.

Example 4

A polylactic acid foam sheet was produced in the same manner as in Example 1, except that the amount of the cross-linking agent was changed to the value presented in Table 1, the temperature of the heating area d of the second extruder was changed to 155° C., and the lip gap of the circular die was changed to adjust the thickness of the foam sheet to be the value presented in Table 1.

Example 5

A polylactic acid foam sheet was produced in the same manner as in Example 1, except that the cross-linking agent was replaced with an isocyanate-based cross-linking agent (DURANATE TPA-100, available from Asahi Kasei Corporation), and the lip gap of the circular die was changed to adjust the thickness of the foam sheet to be the value presented in Table 1.

Example 6

A polylactic acid foam sheet was produced in the same manner as in Example 1, except that the silica used as the filler in the production of the master batch was replaced with titanium oxide (TTO-55(C), available from ISHIHARA SANGYO KAISHA, LTD.), and the lip gap of the circular die was changed to adjust the thickness of the foam sheet to be the value presented in Table 1.

Example 7

A polylactic acid foam sheet was produced in the same manner as in Example 1, except that the polylactic acid for use was replaced with LX-575 (available from Corbion), and the lip gap of the circular die was changed to adjust the thickness of the foam sheet to be the value presented in Table 2.

Example 8

A polylactic acid foam sheet was produced in the same manner as in Example 1, except that the ratio between [3% by mass filler master batch] and the polylactic acid (REVODE190, available from HISUN) was changed as presented in Table 2, and the lip gap of the circular die was changed to adjust the thickness of the foam sheet to be the value presented in Table 2.

Example 9

A polylactic acid foam sheet was produced in the same manner as in Example 1, except that the amount of the cross-linking agent was changed as presented in Table 2, and the lip gap of the circular die was changed to adjust the thickness of the foam sheet to be the value presented in Table 2.

Example 10

A polylactic acid foam sheet was produced in the same manner as in Example 1, except that the lip gap of the circular die was changed to adjust the thickness of the foam sheet to be the value presented in Table 2.

Example 11

A polylactic acid foam sheet was produced in the same manner as in Example 1, except that the amount of the cross-linking agent was changed as presented in Table 2, and the lip gap of the circular die was changed to adjust the thickness of the foam sheet to be the value presented in Table 2.

Example 12

A polylactic acid foam sheet was produced in the same manner as in Example 1, except that the amount of the cross-linking agent and the amount of the foam nucleating agent were changed as presented in Table 2, and the lip gap of the circular die was changed to adjust the thickness of the foam sheet to be the value presented in Table 2.

Comparative Example 1

A polylactic acid foam sheet was produced in the same manner as in Example 1, except that [3% by mass filler master batch] was replaced with polylactic acid (REVODE190, available from HISUN), the cross-linking agent was not used, and the lip gap of the circular die was changed to adjust the thickness of the foam sheet to be the value presented in Table 3.

Comparative Example 2

A polylactic acid foam sheet was produced in the same manner as in Example 1, except that the temperature of the heating area d of the second extruder was changed to 155° C., and the lip gap of the circular die was changed to adjust the thickness of the foam sheet to be the value presented in Table 3.

Comparative Example 3

A polylactic acid foam sheet was produced in the same manner as in Example 1, except that the amount of the cross-linking agent was changed was presented in Table 3, and the lip gap of the circular die was changed to adjust the thickness of the foam sheet to be the value presented in Table 3.

Comparative Example 4

A polylactic acid foam sheet was produced in the same manner as in Example 1, except that the polylactic acid for use was replaced with REVODE110 (available from HISUN), and the lip gap of the circular die was changed to adjust the thickness of the foam sheet to be the value presented in Table 3.

Comparative Example 5

A polylactic acid foam sheet was produced in the same manner as in Example 1, except that the polylactic acid for use was replaced with LX-175 (available from Corbion), the temperature of the heating area d of the second extruder was changed to 130° C., and the lip gap of the circular die was changed to adjust the thickness of the foam sheet to be the value presented in Table 3.

Comparative Example 6

A polylactic acid foam sheet was produced in the same manner as in Example 1, except that REVODE190 (available from HISUN) used as the polylactic acid was replaced with L-175 (available from Corbion), and the lip gap of the circular die was changed to adjust the thickness of the foam sheet to be the value presented in Table 3.

(Measurements and Evaluations)

The obtained foam sheet was subjected to measurements of bulk density, biodegradability, volatile component content, average cell diameter, average thickness, degree of crystallization, MFR, and heat resistance. The measurement results are presented in Tables 1 to 3.

<Bulk Density>

The foam sheet was left to stand for 24 hours or longer in the environment having a temperature of 23° C. and relative humidity of 50%. Then, a test piece in the size of 50 mm×50 mm was cut out from the foam sheet. The bulk density of the cut-out test piece was determined by means of an automatic gravimeter (e.g., DSG-1, available from Toyo Seiki Seisaku-sho, Ltd.) according to the in-water weighing method. A weight (g) of the foam sheet in the atmosphere was weighed, and then a weight (g) of the foam sheet in water was weighed to calculate the bulk density according to the following formula.

Bulk density [g/cm$^3$]=weight of sample in atmosphere [g]/{(weight of sample in atmosphere [g]−weight of sample in fluid [g])×density of fluid [g/cm$^3$]}

<Biodegradability>

The biodegradability was evaluated by determining biodegradation according to JISK6953-2. The evaluation criteria was as follows.

[Evaluation Criteria]
A: Biodegradation of 60% or greater within 45 days
B: Biodegradation of 60% or greater within 6 months
C: Biodegradation of less than 60% within 6 months <Volatile Component Content>

The foam sheet was cut into a square having a side of 5 mm to prepare a sample. To 1 part by mass of the sample, 2 parts by mass of 2-propanol was added. The resultant mixture was dispersed by ultrasonic waves for 30 minutes, followed by storing for 1 day or longer in a refrigerator (5° C.) to obtain a 2-propanol extract solution of the volatile component. The extract solution was analyzed by gas chromatography (GC-14A, available from Shimadzu Corporation) to quantify the volatile component in the foam sheet. The measuring conditions were as follows. When the quantified volatile component was equal to or lower than the detection limit, i.e., the volatile component was not detected in the measurement, the result was determined as "I." When the volatile component was not detected, the result was determined as "II."

Device: Shimadzu GC-14A
Column: CBP20-M 50-0.25
Detector: FID
Injection amount: from 1 μL through 5 μL
Carrier gas: He 2.5 kg/cm$^2$
Hydrogen flow rate: 0.6 kg/cm$^2$
Air flow rate: 0.5 kg/cm$^2$
Chart speed: 5 mm/min
Sensitivity: Range 101×Atten 20
Column temperature: 40° C.
Injection Temp: 150° C.

<Average Cell Diameter>

The obtained foam sheet was cut to expose a cross-section thereof by means of a sharp razor blade (76 Razor, available from Nissin EM Co., Ltd.), and the obtained cross-section of the foam sheet was observed by SEM VE-9800, available from KEYENCE CORPORATION. The obtained three cross-section SEM photographs (magnification: 50 times) were each binarized into the gray component corresponding to a cell and the resin component (white) using image analysis software (Image-Pro Premier, available from Mediacy), and the average cell diameter (Feret's diameter) was determined in the range of 1 mm×1 mm. The average cell diameter of cells having the Feret's diameter of 0.5 μm or greater was calculated. The average cell diameter is preferably within the following ranges.

It is 100 μm or less, when the bulk density of the foam sheet was 0.063 g/cm$^3$ or greater but 0.083 g/cm$^3$ or less
It is 200 μm or greater, when the bulk density of the foam sheet was greater than 0.083 g/cm$^3$ but 0.125 g/cm$^3$ or less <Average Thickness>

The average thickness of the foam sheet was determined by measuring a thickness at 10 points by means of a caliper (DigiMax Caliper, available from Mitutoyo Corporation), and calculating an average value of the measured values.

<Ratio of L-Lactic Acid and D-Lactic Acid>

The foam sheet was frozen and pulverized to prepare a powder of the foam sheet. The foam sheet powder was collected in an Erlenmeyer flask by 200 mg, and 30 mL of a 1N sodium hydroxide aqueous solution was added to the powder. Next, the resultant mixture was heated to 65° C. with shaking the Erlenmeyer flask to dissolve the polylactic acid completely. Subsequently, the pH of the resultant solution was adjusted to 7 with 1N hydrochloric acid, followed by diluting to the predetermined volume using a volumetric flask, to thereby obtain a polylactic acid solution.

Next, the polylactic acid solution was filtered with a membrane filter of 0.45 μm, followed by analyzing through liquid chromatography. Based on the obtained chart, an area ratio was calculated from peaks derived from D-lactic acid and L-lactic acid. The area ratio was used as the abundance ratio to calculate an amount of the D-lactic acid and an amount of the L-lactic acid. The above-described operation was performed 3 times. The arithmetic means of the obtained values were calculated and determined as the amounts of the D-lactic acid and the L-lactic acid that were monomer units of the polylactic acid included the foam sheet.

The measuring device and measuring conditions were as follows.
HPLC device (liquid chromatography): product name "PU-2085 Plus System", available from JASCO Corporation
Column: product name "SUMICHIRALOA5000" (4.6 mm (diameter)×250 mm), available from Sumika Chemical Analysis Service, Ltd.
Column temperature: 25° C.
Mobile phase: a mixed liquid of a 2 mM $CuSO_4$ aqueous solution and 2-propanol ($CuSO_4$ aqueous solution:2-propanol (volume ratio)=95:5)
Mobile phase flow rate: 1.0 mL/min
Detector: UV 254 nm
Injection amount: 20 μL <Degree of Crystallization>

The crystal melting peak area and the cooling crystallization peak area were determined according to Testing Methods for Heat of Transitions of Plastics specified in JISK7122. DSC was performed by means of a differential scanning calorimeter Q-2000 (available from TA Instruments Japan Inc.) in the following conditions.
Sample amount: from 5 mg through 10 mg
Measuring temperature range: from 10° C. through 200° C.
Heating rate: 10° C./min
Purge gas: nitrogen with a flow rate of 50 mL/min <Melt Flow Rate (MFR)>

The obtained foam sheet was frozen and pulverized to prepare a sample. The obtained sample was vacuum dried for 4 hours at 80° C., and the resultant sample was provided to the measurement. The measurement was performed by means of MELT FLOW INDEX TESTER 120-SAS (available from YASUDA SEIKI SEISAKUSHO, LTD.) according to the method B, "Plastics-Determination of the melt mass-flow rate (MFR) and melt volume-flow rate (MVR) of thermoplastics-Part 1" of JIS K7210-1:2014. The measurement was performed 3 times, and the arithmetic mean of the measured values was used as a value of MFR (g/10 min).
Sample amount: from 3 g through 8 g
Pre-heating: 300 seconds
Load hold: 30 seconds
Test temperature: 190° C.
Load: 2.16 kg (21.18 N)

<Molecular Weight>

The obtained foam sheet was measured in the following manner.
Device: GPC (available from Tosoh Corporation)
Detector: RI
Measuring temperature: 40° C.
Mobile phase: tetrahydrofuran
Flow rate: 0.6 mL/min.

The obtained foam sheet was placed in a tetrahydrofuran (THF) solution, and was heated to 65° C. to dissolve the polylactic acid. Subsequently, the resultant solution was filtered with a membrane filter of 0.45 μm, and the obtained solution was provided to the measurement. In the manner as described, the weight average molecular weight of the polylactic acid-containing crosslinked polymer included in the foam sheet was determined.

The number average molecular weight (Mn), weight average molecular weight (Mw), and molecular weight distribution (Mw/Mn) were the number average molecular weight, weight average molecular weight, and molecular weight distribution, respectively, measured by gel permeation chromatography using, as a standard, a calibration curve prepared by polystyrene samples of known molecular weights. As the column, 4 columns, TSKgel SuperHM-N (available from Tosoh Corporation), connected in series were used.

<Heat Resistance>

The storage modulus G'(25° C.) of the obtained foam sheet at room temperature (25° C.), and the storage modulus G'(80° C.) of the foam sheet at 80° C., which simulated hot water, were measured under the following conditions, and the results were evaluated based on the following evaluation criteria.

[Evaluation Criteria]
A: G'(80° C.) was 1/10G'(25° C.) or greater
B: G'(80° C.) was 1/50G'(25° C.) or greater but less than 1/10G'(25° C.)
C: G'(80° C.) was less than 1/50G'(25° C.)

The measuring conditions of the foam sheet were as follows.
Sample shape: A sample was prepared by cutting the foam sheet into a strip having a length of 50 mm and width of 10 mm, and the sample was provided for the measurement.
Device: ARES-G2, available from TA Instruments Japan Inc.
Jig: rectangular torsion fixture
Deformation mode: vibration
Amplitude: The amplitude was varied within the range of from 0.05% through 1%, and the feedback controlled was performed so that the torque did not exceed 200 mN·m.
Angular frequency: 6.28 rad/sec
Measuring temperature range: from 20° C. through 200° C.
Heating rate: 5° C./min <Hydrolysis Resistance>

The foam sheet was immersed in hot water of 95° C. for 5 hours. Thereafter, the sample was taken out and the moisture was removed from the sample, followed by subjecting to GPC to measure a weight average molecular weight. The measurement of the weight average molecular weight was performed as presented in <Molecular weight>. The retention rate of the weight average molecular weight was calculated from the weight average molecular weight before and after the immersion in water according to the following equation.

Retention rate of weight average molecular weight=weight average molecular weight after immersion in water/weight average molecular weight before immersion in water×100

The result was evaluated according to the following evaluation criteria.

[Evaluation Criteria]
1: The retention rate was greater than 75%, but 100% or less.
2: The retention rate was greater than 50%, but 75% or less.
3: The retention rate was 50% or less.

TABLE 1

|  |  | Ex. 1 | Ex. 2 | Ex. 3 | Ex. 4 | Ex. 5 | Ex. 6 |
|---|---|---|---|---|---|---|---|
| Polylactic acid | Polylactic acid | Revode 190 | Revode 190 | Revode 190 | Revode 190 | Revode 190 | Revode 190 |
|  | L-lactic acid rate (%) | 99.5 | 99.5 | 99.5 | 99.5 | 99.5 | 99.5 |
|  | Ratio of polylactic acid in organic matter (mass %) | 99.5 | 99.5 | 99.5 | 99.5 | 99.5 | 99.5 |
|  | Wt. avg. Mw | 168,000 | 168,000 | 168,000 | 168,000 | 168,000 | 168,000 |
| Filler | Filler | silica | — | silica | silica | silica | titanium oxide |
|  | Particle diameter (μm) | 0.004 | — | 0.004 | 0.004 | 0.004 | 0.004 |
|  | Amount (mass %) | 0.5 | 0 | 0.5 | 0.5 | 0.5 | 0.5 |
| Cross-linking agent | Reactive group | epoxy | epoxy | epoxy | epoxy | isocyanate | epoxy |
|  | Ratio in organic matter (mass %) | 0.5 | 0.5 | 1.3 | 1.5 | 0.5 | 0 5 |
| Physical properties of composition | MFR, (190° C., 2.16 kg) | 2 | 2 | 0.6 | 0.3 | 3 | 2 |
| Physical properties of foam sheet | Bulk density (g/cm$^3$) | 0.114 | 0.110 | 0.083 | 0.066 | 0.125 | 0.109 |
|  | Sheet thickness (mm) | 2.0 | 2.0 | 2.0 | 2.0 | 2.0 | 2.0 |
|  | L-lactic acid:D-lactic acid | 99.5:0.5 | 99.5:0.5 | 99.5:0.5 | 99.5:0.5 | 99.5:0.5 | 99.5:0.5 |
|  | Degree of crystallization (J/g) | 42 | 27 | 25 | 20 | 31 | 36 |
|  | Mw | 230,000 | 232,000 | 270,000 | 265,000 | 210,000 | 225,000 |
|  | Average cell diameter (μm) | 74 | 160 | 130 | 250 | 84 | 90 |
| Evaluation | Volatile component content | I | I | I | I | I | I |
|  | Biodegradability | A | A | B | B | A | A |
|  | Hydrolysis resistance | 2 | 2 | 1 | 1 | 2 | 2 |
|  | Heat resistance | A | B | B | B | B | A |

TABLE 2

|  |  | Ex. 7 | Ex. 8 | Ex. 9 | Ex. 10 | Ex. 11 | Ex. 12 |
|---|---|---|---|---|---|---|---|
| Polylactic acid | Polylactic acid | LX-575 | Revode 190 | Revode 190 | Revode 190 | Revode 190 | Revode 190 |
|  | L-lactic acid rate (%) | 98 | 99.5 | 99.5 | 99.5 | 99.5 | 99.5 |
|  | Ratio of polylactic acid in organic matter (mass %) | 99.5 | 99.5 | 98.7 | 99.5 | 99.5 | 98.3 |
|  | Wt. avg. Mw | 178,000 | 168,000 | 168,000 | 168,000 | 168,000 | 168,000 |
| Filler | Filler | silica | silica | silica | silica | silica | silica |
|  | Particle diameter (μm) | 0.004 | 0.004 | 0.004 | 0.004 | 0.004 | 0.004 |
|  | Amount (mass %) | 0.5 | 1 | 0.5 | 0.5 | 0.5 | 1 |
| Cross-linking agent | Reactive group | epoxy | epoxy | epoxy | epoxy | epoxy | epoxy |
|  | Ratio in organic matter (mass %) | 0.5 | 0.5 | 1.3 | 0.5 | 0.1 | 1.7 |

TABLE 2-continued

|  |  | Ex. 7 | Ex. 8 | Ex. 9 | Ex. 10 | Ex. 11 | Ex. 12 |
|---|---|---|---|---|---|---|---|
| Physical properties of composition | MFR, (190° C., 2.16 kg) | 1 | 2 | 0.6 | 2 | 6 | 0.2 |
| Physical properties of foam sheet | Bulk density (g/cm³) | 0.063 | 0.125 | 0.085 | 0.123 | 0.115 | 0.065 |
|  | Sheet thickness (mm) | 2.0 | 2.0 | 9.50 | 0.14 | 2.0 | 2.0 |
|  | L-lactic acid: D-lactic acid | 98.0:2.0 | 99.5:0.5 | 99.5:0.5 | 99.5:0.5 | 99.5:0.5 | 99.5:0.5 |
|  | Degree of crystallization (J/g) | 31 | 44 | 26 | 28 | 20 | 19 |
|  | Mw | 223,000 | 230,000 | 261,000 | 225,000 | 201,000 | 269,000 |
|  | Average cell diameter (μm) | 120 | 64 | 180 | 65 | 160 | 80 |
| Evaluation | Volatile component content | I | I | I | I | I | I |
|  | Biodegradability | A | A | B | A | A | B |
|  | Hydrolysis resistance | 2 | 2 | 1 | 2 | 2 | 1 |
|  | Heat resistance | B | A | B | A | B | B |

TABLE 3

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Polylactic acid | Polylactic acid | Revode 190 | Revode 190 | Revode 190 | Revode 110 | LX-175 | LX-175 |
|  | L-lactic acid rate (%) | 99.5 | 99.5 | 99.5 | 96.2 | 96 | 99.5 |
|  | Ratio of polylactic acid in organic matter (mass %) | 100 | 99.5 | 97.9 | 99.5 | 99.5 | 99.5 |
|  | Wt. avg. Mw | 168,000 | 168,000 | 168,000 | 164,000 | 185,000 | 170,000 |
| Filler | Filler | — | silica | silica | silica | silica | silica |
|  | Particle diameter (μm) | — | 0.004 | 0.004 | 0.004 | 0.004 | 0.004 |
|  | Amount (mass %) | 0 | 0.5 | 0.5 | 0.5 | 0.5 | 0.5 |
| Cross-linking agent | Reactive group | — | epoxy | epoxy | epoxy | epoxy | epoxy |
|  | Ratio in organic matter (mass %) | 0 | 0.5 | 2.1 | 0.5 | 0.5 | 0.5 |
| Physical properties of composition | MFR, (190° C., 2.16 kg) | 7 | 2 | 0.2 | 3 | 1 | 4 |
| Physical properties of foam sheet | Bulk density (g/cm³) | 0.313 | 0.833 | 0.625 | 0.069 | 0.042 | 0.298 |
|  | Sheet thickness (mm) | 2.0 | 2.0 | 2.0 | 2.0 | 2.0 | 2.0 |
|  | L-lactic acid: D-lactic acid | 99.5:0.5 | 99.5:0.5 | 99.5:0.5 | 96.2:3.8 | 99.5:0.5 | 99.5:0.5 |
|  | Degree of crystallization (J/g) | 23 | 18 | 8 | 16 | 14 | 24 |
|  | Mw | 170,000 | 225,000 | 260,000 | 220,000 | 235,000 | 198,000 |
|  | Average cell diameter (μm) | 320 | 320 | 32 | 120 | 210 | 200 |

TABLE 3-continued

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Evaluation | Volatile component content | I | I | I | I | I | I |
|  | Biodegradability | A | A | C | A | A | B |
|  | Hydrolysis resistance | 3 | 2 | 1 | 3 | 2 | 2 |
|  | Heat resistance | B | C | C | C | C | B |

As presented in Examples above, the foam sheet of the present disclosure can achieve both heat resistance and a high expansion ratio while having sufficient biodegradability. Regarding the heat resistance of the foam sheet, the average cell diameter is also considered in addition to the evaluation item of the heat resistance. The smaller the average cell diameter of the foam sheet is, the smaller the thermal conductivity of the foam sheet is. As a result, the heat resistance tends to be improved. In Comparative Example 1, for example, the result of the evaluation item of heat resistance was "B" but the average cell diameter was outside the preferable range. Therefore, the heat resistance of the foam sheet of Comparative Example 1 was not satisfactory. Moreover, it was found that in Comparative Examples 1 to 3, the values of the bulk density were large, and the foam sheets having a desirable expansion ratio could not be obtained. In Comparative Example 2, moreover, elongational crystallization due to foaming did not sufficiently occur because of an insufficient expansion ratio. As a result, the degree of crystallization was low (18 J/g), and the result of the heat resistance was not desirable. In Comparative Example 6, furthermore, the bulk density of the foam sheet was outside the range, and the sheet of the high expansion ratio could not be obtained.

Example 13

The foam sheet obtained in Example 1 was subjected to thermoforming by means of a match mold-type molding device equipped with up and bottom heaters and a mold, to thereby produce a formed product of Example 13. After performing preheating for 20 seconds with setting a temperature of a pre-heater to 250° C., thermoforming was performed by nipping the foam sheet with a mold a temperature of which was set to 80° C.

The area change rate of the formed product obtained in Example 13 at the time of hot water immersion was determined in the following manner.

The formed product obtained in Example 13 was left to stand for 24 hours or longer in the environment having a temperature of 23° C. and relative humidity of 50%. The area of the foam sheet having top and bottom surfaces parallel to each other was cut into a square having a length of 5 cm and a width of 5 cm, to thereby prepare a sample. The sample was then immersed in 300 mL of hot water of 92° C. for 3 minutes. Thereafter, the sample was left to stand for 1 hour in the environment having a temperature of 23° C. and relative humidity of 50%. The area of the sample was determined, and the area change rate was calculated according to the following equation.

Area change rate={(area before heat storage−area after heat storage)/area before heat storage}×100

The area change rate of the formed body of Example 13 was 6%, which was an excellent result.

Comparative Example 7

A formed product was obtained using the foam sheet obtained in Comparative Example 3 and evaluated in the same manner as in Example 13. As a result, the area change rate was 15%, which was the result inferior to the result of Example 13.

What is claimed is:

1. A foam sheet, comprising:
a composition including polylactic acid,
wherein the polylactic acid includes, as monomer units, D-lactic acid and L-lactic acid, and an amount of the D-lactic acid or the L-lactic acid in the polylactic acid is 98 mol % or greater,
an amount of the polylactic acid is 98% by mass or greater relative to a total amount of organic matter in the foam sheet, and
bulk density of the foam sheet is 0.063 g; cm$^3$ or greater but 0.125 g/cm$^3$ or less.

2. The foam sheet according to claim 1,
wherein the bulk density of the foam sheet is 0.063 g/cm$^3$ or greater but 0.083 g/cm$^3$ or less.

3. The foam sheet according to claim 1,
wherein a melt flow rate of the foam sheet at a test temperature of 190° C. with load of 2.16 kg is 0.3 g/10 min or greater but 5 g/10 min or less.

4. The foam sheet according to claim 1,
wherein the foam sheet has a value of 20 J/g or greater, where the value is obtained by subtracting a cooling crystallization peak area from a crystal melting peak area as determined by differential scanning calorimetry (DSC).

5. The foam sheet according to claim 1,
wherein an organic compound having a boiling point of −20° C. or higher hut lower than 150° C. at 1 atm is not detected when the foam sheet is subjected to measurement below:
[Measurement]
part of the foam sheet is dispersed in a solvent to prepare a dispersion liquid, and a supernatant liquid of the dispersion liquid is measured by gas chromatography to quantify the organic compound.

6. The foam sheet according to claim 1,
wherein an average thickness of the foam sheet is 0.1 mm or greater but 10 mm or less.

7. The foam sheet according to claim 1,
wherein the foam sheet includes a crosslinked polymer obtained through a reaction between the polylactic acid and a cross-linking agent, and a weight average molecular weight of the crosslinked polymer is from 250,000 through 350,000.

8. A product, comprising:
the foam sheet according to claim 1.

9. The product according to claim 8,
wherein the product is at least one selected from the group consisting of a hag, a packaging container, tableware, cutlery, stationary, and a buffer material.

10. A formed product, comprising:
the foam sheet according to claim 1, which is formed by thermoforming.

11. A method for producing a foam sheet, the method comprising:
kneading polylactic acid in presence of a compressive fluid at a temperature lower than a melting point of the polylactic acid to obtain a composition; and
removing the compressive fluid to foam the composition, to thereby produce the foam sheet according to claim 1.

12. The method according to claim 11,
wherein the compressive fluid is carbon dioxide.

13. The method according to claim 11,
wherein the kneading includes kneading the polylactic acid and filler.

14. The method according to claim 13,
wherein the kneading includes kneading the polylactic acid, the filler, and a cross-linking agent.

15. The method according to claim 14,
wherein the cross-linking agent is an epoxy-based cross-linking agent or an isocyanate-based cross-linking agent.

* * * * *